(12) United States Patent
Zhu

(10) Patent No.: US 11,230,440 B1
(45) Date of Patent: Jan. 25, 2022

(54) UNLOADING DEVICE

(71) Applicant: TRIPLE WIN TECHNOLOGY (SHENZHEN) CO. LTD., Shenzhen (CN)

(72) Inventor: Cong Zhu, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 17/088,945

(22) Filed: Nov. 4, 2020

(30) Foreign Application Priority Data

Sep. 22, 2020 (CN) .......................... 202011002737.9

(51) Int. Cl.
*B65G 47/24* (2006.01)
*B65G 65/34* (2006.01)
*B65G 65/00* (2006.01)

(52) U.S. Cl.
CPC ........... *B65G 47/24* (2013.01); *B65G 65/005* (2013.01); *B65G 65/34* (2013.01); *B65G 2203/0233* (2013.01)

(58) Field of Classification Search
CPC ...... B65G 65/00; B65G 47/24; B65G 65/005; B65G 65/34; B65G 2207/46
USPC .................................. 198/435; 414/331, 417
See application file for complete search history.

(56) References Cited

U.S. PATENT DOCUMENTS

| | | | | | |
|---|---|---|---|---|---|
| 4,634,333 | A | * | 1/1987 | Butterly, Jr. | B65G 65/00 187/251 |
| 5,409,097 | A | * | 4/1995 | Hoegger | B65G 47/57 198/463.2 |
| 6,227,377 | B1 | * | 5/2001 | Bonnet | B65G 21/12 198/435 |
| 7,946,797 | B2 | * | 5/2011 | Smith | B65D 19/42 414/331.09 |
| 8,312,983 | B2 | * | 11/2012 | Kuo | H01M 10/14 198/435 |
| 8,342,311 | B2 | * | 1/2013 | Philipp | B65G 47/5154 198/345.1 |
| 8,925,709 | B2 | * | 1/2015 | Studer | B65G 65/00 198/435 |
| 9,022,204 | B2 | * | 5/2015 | Wang | B65G 47/643 198/435 |

* cited by examiner

*Primary Examiner* — James R Bidwell
(74) *Attorney, Agent, or Firm* — ScienBiziP, P.C.

(57) ABSTRACT

An unloading device includes a loading assembly, an unloading assembly, and an alignment assembly. The loading assembly includes a loading rack and a loading tray. The unloading assembly includes a conveyor belt and a movable rod. The movable rod pushes the loading tray toward the conveyor belt. The alignment assembly includes a sensing member, a processor, and a driving member. The sensing member senses a first distance between different positions of the loading tray and the sensing member. A second distance is defined between the sensing member and the loading rack. The processor calculates a position deviation of the loading tray relative to the conveyor belt and controls the driving member to drive the loading rack to move to compensate for the position deviation.

18 Claims, 6 Drawing Sheets

UNLOADING DEVICE

FIELD

The subject matter herein generally relates to an unloading device for unloading materials.

BACKGROUND

In an assembly line, materials to be transported on the assembly line are generally held in a tray which is pushed onto a conveyor belt of an assembly line. However, alignment between the tray and a conveyor belt is not always accurate, which causes the tray to jam, thereby affecting efficiency.

BRIEF DESCRIPTION OF THE DRAWINGS

Implementations of the present disclosure will now be described, by way of embodiments, with reference to the attached figures.

DETAILED DESCRIPTION

Figure 1:
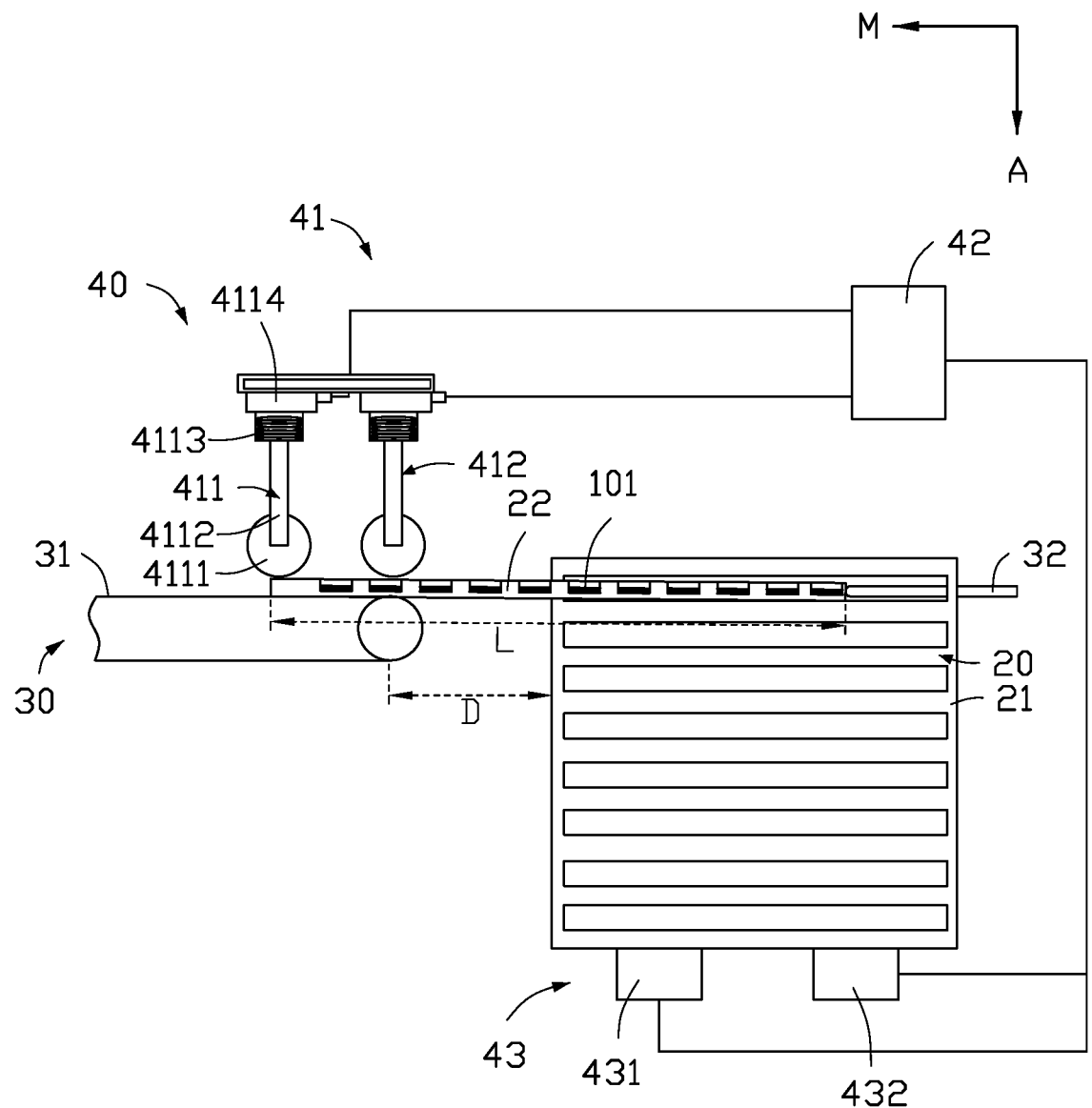
FIG. 1 is a schematic side view of an unloading device according to an embodiment when there is no position deviation.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or another word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

FIG. 1 shows an embodiment of a unloading device 100 for discharging and conveying materials 101. The unloading device 100 includes a loading assembly 20, a unloading assembly 30, and an alignment assembly 40.

The loading assembly 20 includes a loading rack 21 and at least one loading tray 22 movably received on the loading rack 21. The loading tray 22 is substantially rectangular in shape. The loading tray 22 is used for holding the materials 101.

The discharge assembly 30 includes a conveyor belt 31 and a movable rod 32. The loading rack 21 is arranged between the conveyor belt 31 and the movable rod 32. A distance D between the conveyor belt 31 and the loading rack 21 is less than a length L of the loading tray 22. The movable rod 32 is used to extend into the loading rack 21 and push the loading tray 22 out of the loading rack 21. The conveyor belt 31 is used to transport the loading tray 22 containing the materials 101 to a next processing station (such as an assembly station).

Figure 2:
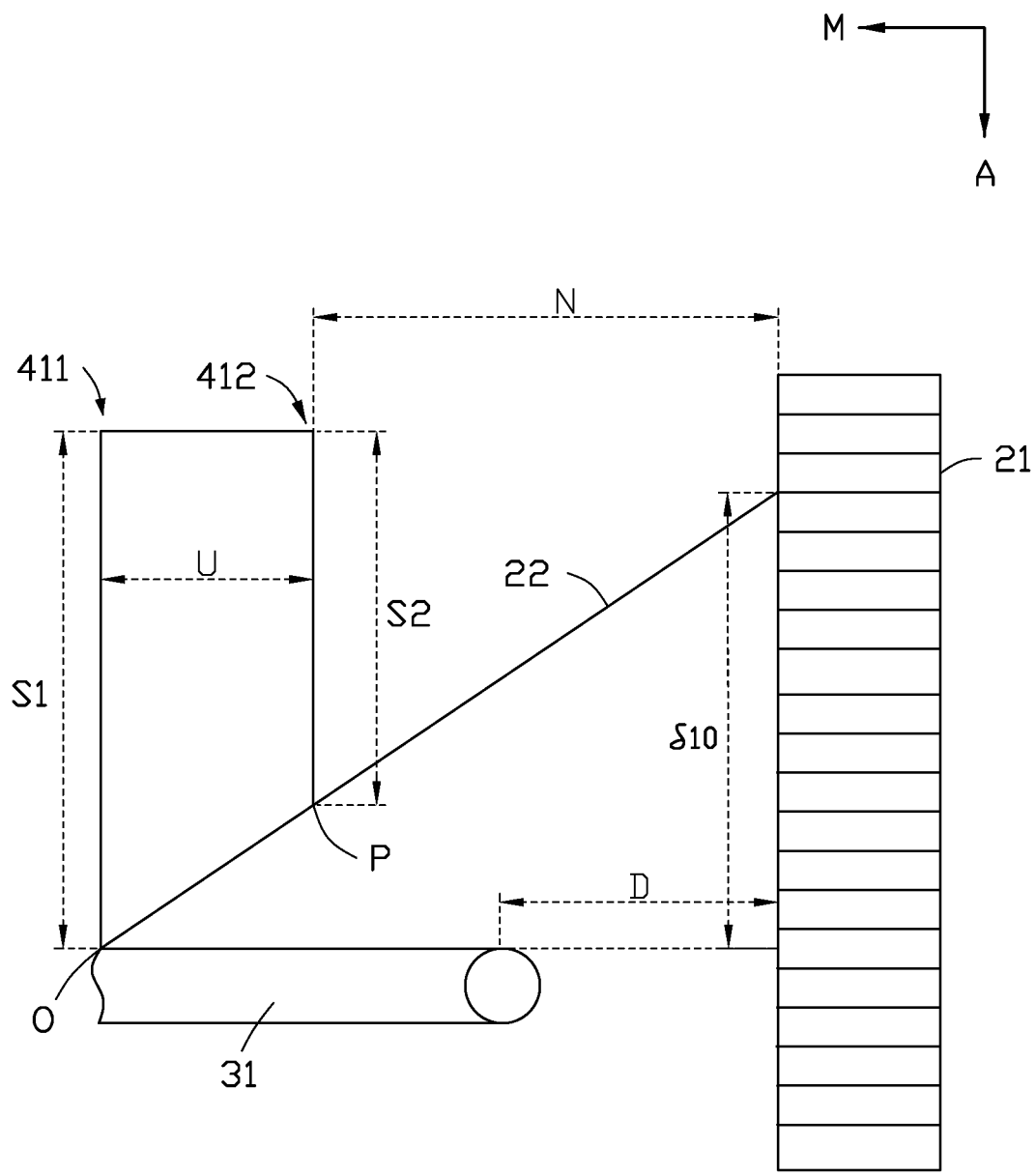
FIG. 2 is a schematic side view of a loading tray of the unloading device shown in FIG. 1 with a positive height deviation.
Figure 3:
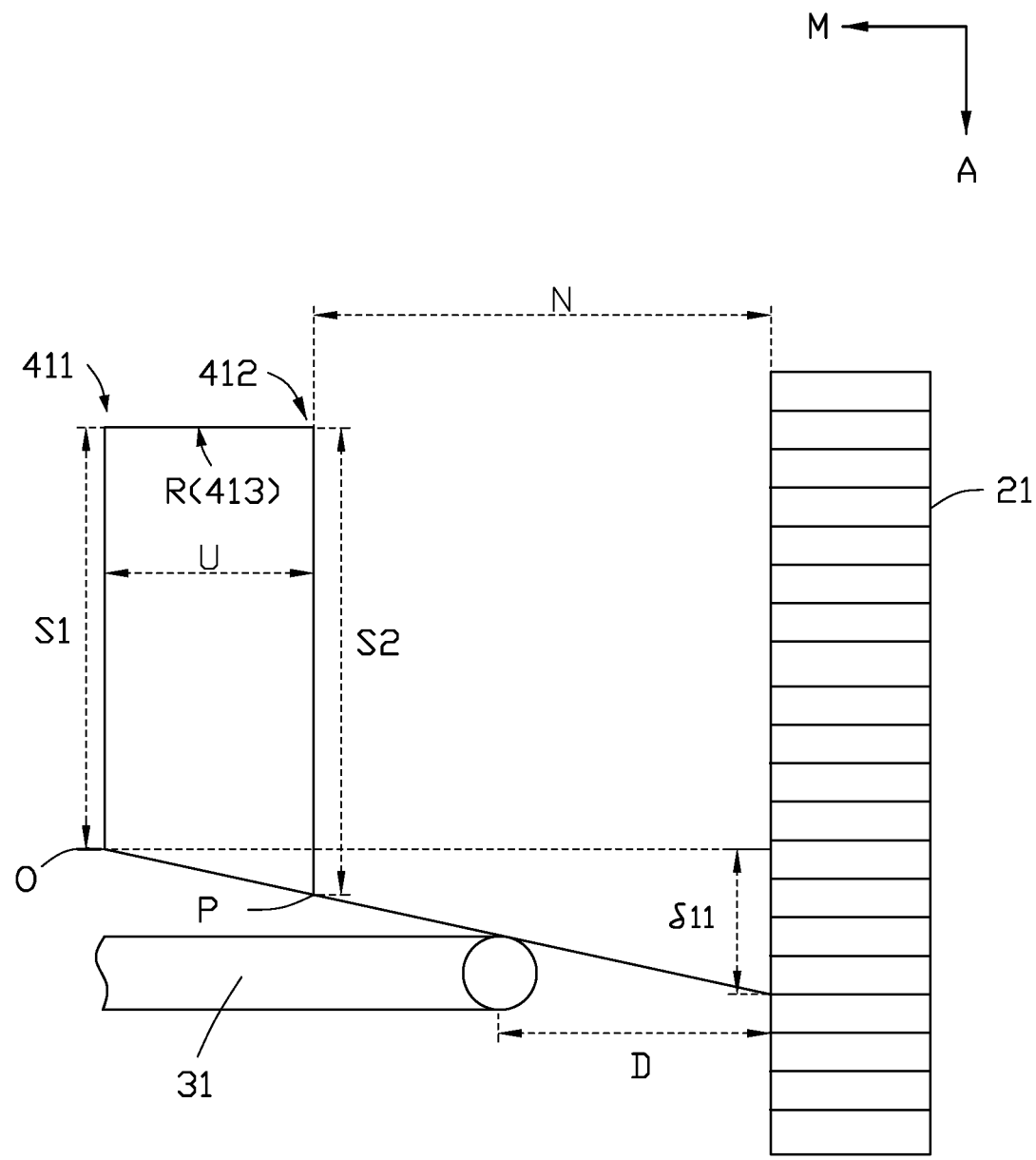
FIG. 3 is a schematic side view of the loading tray of the unloading device shown in FIG. 1 with a negative height deviation.
Figure 4:
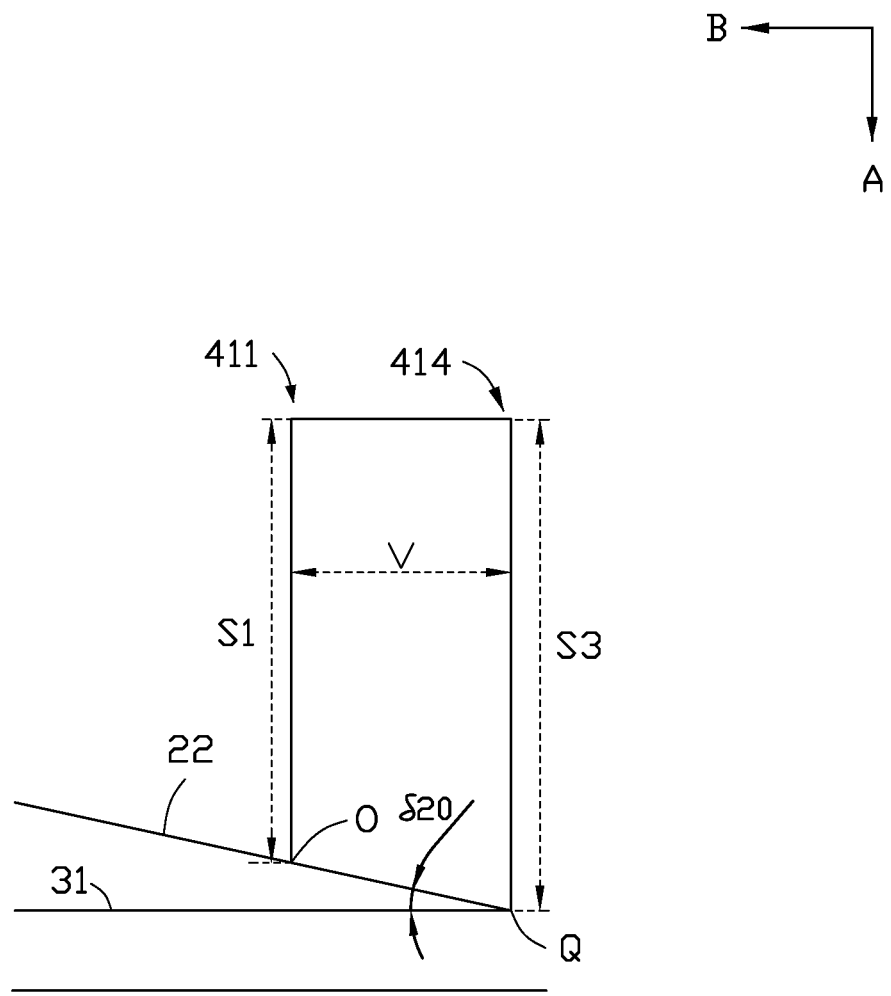
FIG. 4 is a schematic side view of the unloading tray shown in FIG. 1 with a positive angular deviation.
Figure 5:
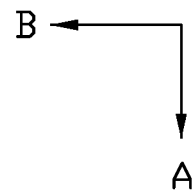
FIG. 5 is a schematic side view of the loading tray shown in FIG. 1 with a negative angular deviation.
Figure 5:
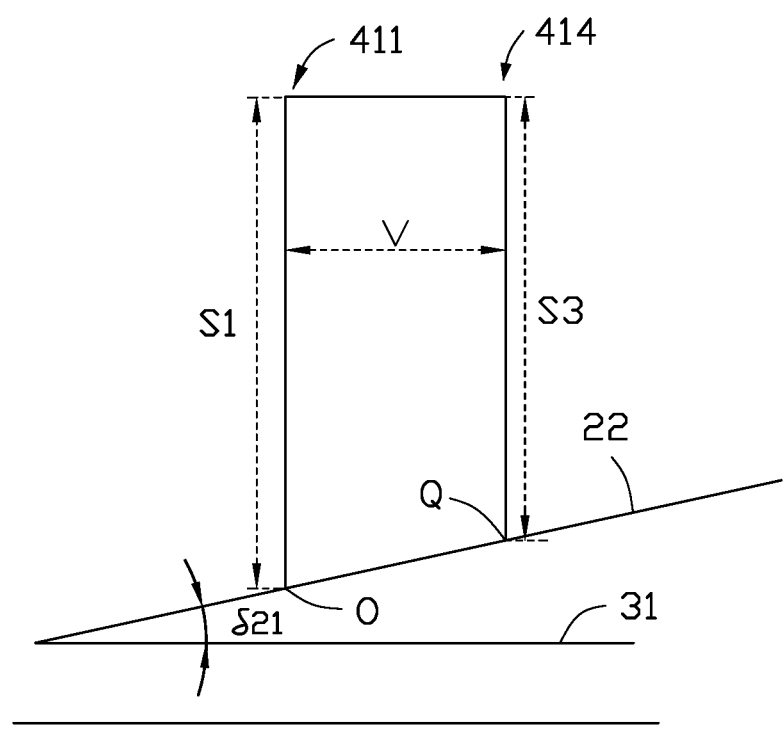

As shown in FIG. 2, when a plane of the loading tray 22 is higher than a plane of the conveyor belt 31, the loading tray 22 has a positive height deviation. As shown in FIG. 3, when the plane of the loading tray 22 is lower than the plane of the conveyor belt 31, the loading tray 22 has a negative height deviation. As shown in FIG. 4, when the plane of the loading tray 22 is not parallel to the plane of the conveyor belt 31 and the loading tray 22 is tilted clockwise about an extension direction M toward the conveyor belt 31, the loading tray 22 has a positive angular deviation. As shown in FIG. 5, when the plane of the loading tray 22 is not parallel to the plane of the conveyor belt 31 and the loading tray 22 is tilted counterclockwise about an extension direction M toward the conveyor belt 31, the loading tray 22 has a negative angular deviation.

The alignment assembly 40 includes a sensing member 41, a processor 42, and a driving member 43. The sensing member 41 may be arranged at one end of the conveyor belt 31 adjacent to the loading rack 21. The sensing member 41 is used to sense a first distance between different positions of the same tray 22 and the sensing member 41. There is a fixed second distance between the sensing member 41 and the loading rack 21. The processor 42 is electrically coupled to the sensing member 41, the driving member 43, and the movable rod 32. The processor 42 is configured to calculate a position deviation of the loading rack 21 compared to the conveyor belt 31 according to the first distance and the second distance, and control the driving member 43 to drive the loading rack frame 21 to move to compensate for the position deviation and to control a movement state of the movable rod 32.

In use, the loading tray 22 loaded with the materials 101 is slowly pushed out of the loading rack 21 by the movable rod 32. When one end of the loading tray 22 rests on the conveyor belt 31, an opposite end of the loading tray 22 rests on the loading rack 21 (because the distance D between the conveyor belt 31 and the loading rack 21 is less than the length L of the loading tray 22). At this time, the end of the loading tray 22 resting on the conveyor belt 31 is within a sensing range of the sensing member 41. The sensing member 41 is used for sensing the first distance between the sensing member 41 and the different positions of the end of the loading tray 22 on the conveyor belt 31.

If the first distance between the different positions of the loading tray 22 and the sensing member 41 are different, the processor 42 determines that the loading rack 21 has a position deviation, and the processor 42 controls the movable rod 32 to temporarily stop pushing the loading tray 22. The processor 42 calculates a size of a position deviation ($\delta10$, $\delta11$) according to the first distance and the second distance, and then controls the driving member 43 to drive the loading rack 21 to move to compensate for the position deviation ($\delta10$, $\delta11$). At this time, the sensor 41 senses that the first distance between the different positions of the loading tray 22 and the sensor 41 are the same. Then, the processor 42 controls the movable rod 32 to continue to push the loading tray 22 so that the loading tray 22 is separated from the loading rack 21.

If distances between the different positions of the loading tray 22 and a reference surface R are the same, the processor 42 determines that there is no position deviation of the loading rack 21, and the processor 42 controls the movable rod 32 to continue to push the loading tray 22 until the loading tray 22 is separated from the loading rack 21.

In one embodiment, the driver 43 includes a first driver 431, a second driver 432, and a third driver (not shown). Under the action of the processor 42, the first driver 431 is used to drive the loading rack 21 to move in a vertical direction A, and the second driver 432 is used to drive the loading rack 21 to rotate around an extension direction M of the conveyor belt 31. The vertical direction A and the extension direction M are substantially perpendicular to each other, and the third driver is used to drive the movable rod 32 to push or temporarily stop pushing the loading tray 22.

In one embodiment, the sensing member 41 includes a first distance sensor 411 and a second distance sensor 412. The first distance sensor 411 and the second distance sensor 412 are located a same distance from an upper surface of the conveyor belt 31 along the extension direction M. A sum of a distance U between the first distance sensor 411 and the second distance sensor 412 and a distance N between the first distance sensor 411 and the loading rack 21 is less than the length L of the loading tray 22, so that the end of the loading tray 22 resting on the loading rack 21 while the other end rests on the conveyor belt 31 can be sensed by the first distance sensor 411 and the second distance sensor 412. The first distance sensor 411 is used to sense a first vertical distance S1 between the loading tray 22 and the first distance sensor 411 at a first position O, and the second distance sensor 412 is used to sense a second vertical distance S2 between the same loading tray 22 and the second distance sensor 412 at a second position P. The first distance includes the first vertical distance S1 and the second vertical distance S2. After receiving the first vertical distance S1, the second vertical distance S2, the distance U, and the distance N, the processor 42 calculates the height deviation of the loading rack 21 in the vertical direction A, and the first driver 431 is controlled to drive the loading rack 21 to move to remove the height deviation.

Referring to FIGS. 1 and 2, in one embodiment, the second distance sensor 412 is located between the first distance sensor 411 and the loading rack 21. During operation, when the first vertical distance S1 sensed by the first distance sensor 411 is greater than the second vertical distance S2 sensed by the second distance sensor 412, the processor 42 determines that the loading rack 21 has a positive height deviation MO in the vertical direction A, and the processor 42 controls the first driver 431 to drive the loading rack 21 to move downward to remove the positive height deviation $\delta10$.

Referring to FIGS. 1 and 3, if the first vertical distance S1 sensed by the first distance sensor 411 is smaller than the second vertical distance S2 sensed by the second distance sensor 412, the processor 42 determines that the loading rack 21 has a negative height deviation $\delta11$ in the vertical direction A, and the processor 42 controls the first driver 431 to drive the loading rack 21 to move upward to remove the negative height deviation $\delta11$.

Referring to FIG. 1, FIG. 4, and FIG. 5, in one embodiment, the sensing member 41 further includes a third distance sensor 414, and the third distance sensor 414 and the first distance sensor 411 are arranged a same distance above the conveyor belt 31 along a horizontal direction B. The horizontal direction B, the vertical direction A, and the extension direction M are substantially perpendicular to each other. A distance V between the third distance sensor 414 and the first distance sensor 411 is smaller than a width W of the loading tray 22 (see FIG. 6). The third distance sensor 414 is used to sense a third vertical distance S3 between a third position Q of the loading tray 22 and the third distance sensor 414. The first distance further includes the third vertical distance S3. After receiving the distance V and the third vertical distance S3, the processor 42 calculates the angular deviation ($\delta20$, $\delta21$) of the loading rack 21 in the horizontal direction B, and controls the driving member 43 to drive the loading rack 21 to move to remove the angular deviation ($\delta20$, $\delta24$).

In one embodiment, in operation, when the first vertical distance S1 sensed by the first distance sensor 411 is greater than the third vertical distance S3 sensed by the third distance sensor 414, the processor 42 determines that the loading rack 21 has a positive angular deviation $\delta20$ in the horizontal direction B, and the processor 42 controls the second driver 432 to drive the loading rack 21 to rotate counterclockwise around the horizontal direction B to remove the positive angle deviation $\delta20$. Similarly, when the first vertical distance S1 sensed by the first distance sensor 411 is less than the third vertical distance S3 sensed by the third distance sensor 414, the processor 42 determines that the loading rack 21 has a negative angular deviation $\delta21$ in the horizontal direction B, and the processor 42 controls the second driver 432 to drive the loading rack 21 to rotate clockwise around the horizontal direction B to remove the negative angle deviation $\delta21$.

Referring again to FIG. 1, in one embodiment, each of the first distance sensor 411 and the second distance sensor 412 includes a pulley 4111, a wheel rod 4112, an elastic restoring member 4113, and a pressure sensitive member 4114. The wheel rod 4112 is coupled between the pulley 4111 and the elastic restoring member 4113, and the pulley 4111 provides a rolling contact with a side of the loading tray 22 facing away from the conveyor belt 31. The pressure sensitive member 4114 is used to sense a pressure at a contact position between the pulley 4111 and the loading tray 22, and the elastic restoring member 4113 is used to provide a restoring force for restoring the wheel rod 4112 and the pulley 4111. The pulley 4111 increases friction between the conveyor belt 31 and the loading tray 22, and a length of the elastic restoring member 4113 can expand and contract so that the loading tray 22 is not easily jammed.

In operation, if there is a positional deviation of the loading rack 21, a pressure F1 sensed by the pressure sensitive element 4114 of the first distance sensor 411 is different from a pressure F2 sensed by the pressure sensitive element 4114 of the second distance sensor 412. By establishing a linear relationship between a pressure difference of the pressure sensitive elements 4114 (for example, |F1−F2|) and an actual measured position deviation, the processor 42 can calculate to obtain the position deviation corresponding to any pressure difference based on the linear relationship. By providing the pressure sensitive elements 4114 and the processor 42, intelligent correction of position deviations can be realized, which is beneficial to save time and improve a transmission efficiency and accuracy of the materials 101.

Figure 6:
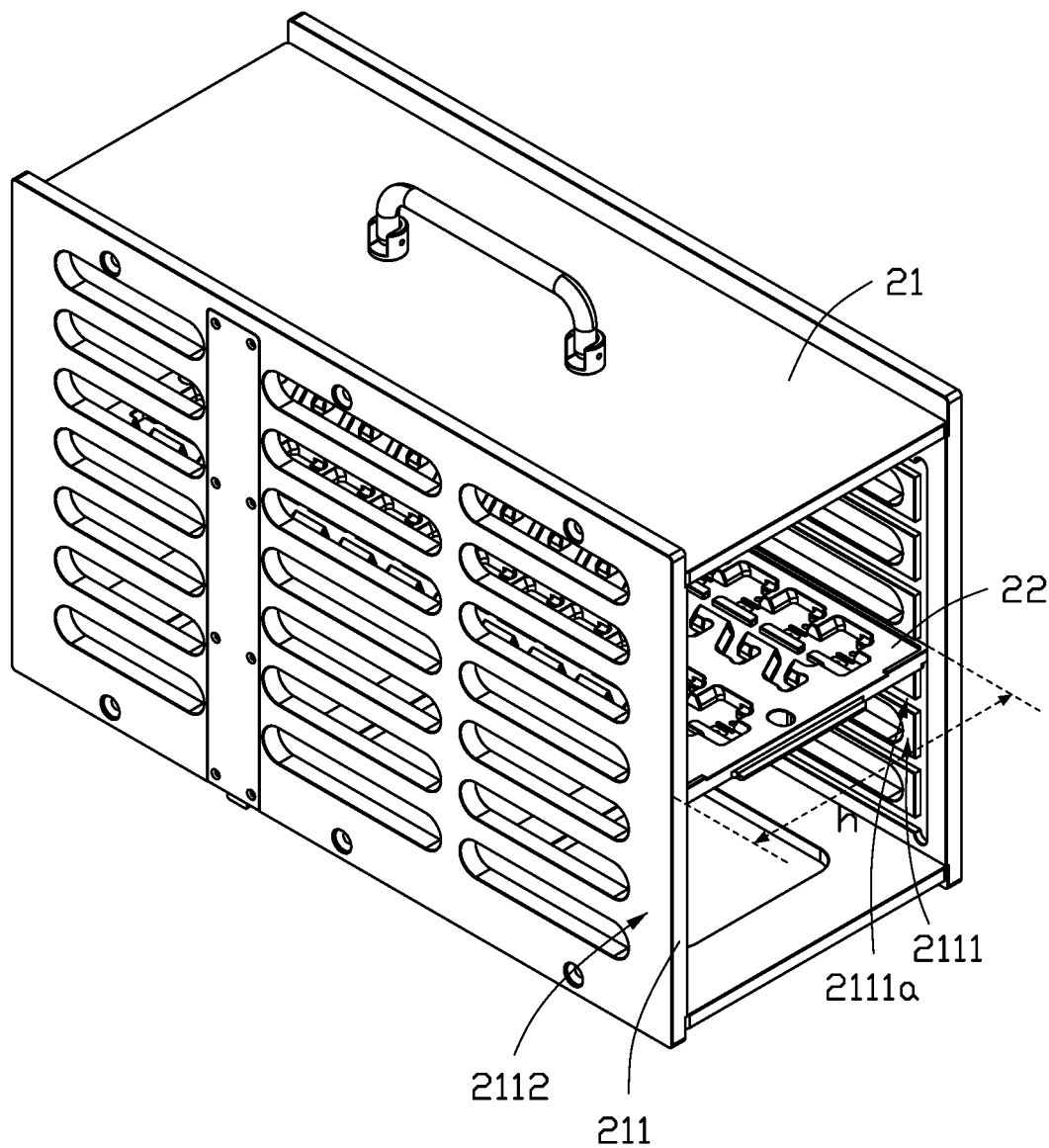
FIG. 6 is a schematic diagram of a loading assembly of the unloading device shown in FIG. 1.

Referring to FIG. 6, in one embodiment, the loading rack 21 includes two opposite side walls 211. Each side wall 211 includes an inner surface 2111 and an outer surface 2112. The inner surface 2111 faces the other side wall 211, and the outer surface 2112 faces away from the other side wall 211. Each inner surface 2111 is provided with a plurality of parallel and equidistantly spaced sliding grooves 2111a, and each of the sliding grooves 2111a of one side wall 211 corresponds to a respective sliding groove 2111a of the other side wall 211. Each loading tray 22 is received in the corresponding two opposite sliding grooves 2111a.

In one embodiment, the first driver 431 is used to drive the loading rack 21 to move at predetermined height increments, so that the movable rod 32 extends between every two opposite sliding grooves 2111a to push the corresponding loading tray 22.

In one embodiment, the loading assembly 20, the unloading assembly 30, and the alignment assembly 40 are arranged on a machine platform (not shown).

In one embodiment, the driver 43 is a step motor, and the processor 42 includes a programmable logic controller.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An unloading device for unloading and conveying materials, the unloading device comprising:
  a loading assembly comprising a loading rack and at least one loading tray movably received in the loading rack, the loading tray used for holding the materials;
  an unloading assembly comprising a conveyor belt and a movable rod, the loading rack arranged between the conveyor belt and the movable rod, a distance between the conveyor belt and the loading rack smaller than a length of the loading tray, the movable rod used to extend into the loading rack and push the corresponding loading tray toward the conveyor belt, and the conveyor belt used to transport the loading tray; and
  an alignment assembly comprising a sensing member, a processor, and a driving member, the sensing member used to sense a first distance between each of at least two positions of the loading tray and the sensing member, a second distance being defined between the sensing member and the loading rack; wherein:
  the processor is used to calculate a position deviation of the loading tray relative to the conveyor belt according to the at least two first distances and the second distance, the processor configured to control the driving member to drive the loading rack to move to compensate for the position deviation.

2. The unloading device of claim 1, wherein:
  the driving member comprises a first driver and a second driver;
  the first driver is used to drive the loading rack to move in a vertical direction;
  the second driver is used to drive the loading rack to rotate in a direction parallel to an extension direction of the conveyor belt.

3. The unloading device of claim 2, wherein:
  the sensing member comprises a first distance sensor and a second distance sensor;
  the first distance sensor and the second distance sensor are arranged a same distance above the conveyor belt along the extension direction of the conveyor belt;
  the first distance sensor is used to sense a first vertical distance between a first position of the loading plate and the first distance sensor, and the second distance sensor is used to sense a second vertical distance between a second position of the loading tray and the second distance sensor;
  the first distance comprises the first vertical distance and the second vertical distance; and
  the processor calculates a height deviation of the loading rack in the vertical direction relative to the conveyor belt according to the first vertical distance, the second vertical distance, and the second distance, and controls the first driver to drive the loading rack to move to remove the height deviation.

4. The unloading device of claim 3, wherein:
  the second distance sensor is located between the first distance sensor and the loading rack; and
  a sum of a distance between the first distance sensor and the second distance sensor and a distance between the first distance sensor and the loading rack is less than the length of the loading tray.

5. The unloading device of claim 3, wherein:
  the sensing member further comprises a third distance sensor:
  the third distance sensor and the first distance sensor are arranged a same distance above the conveyor belt along a horizontal direction;
  a third distance is defined between the third distance sensor and the first distance sensor;
  the third distance sensor is used to sense a third vertical distance between a third position of the loading tray and the third distance sensor;
  the first distance further comprises the third vertical distance; and
  the processor calculates an angular deviation of the loading rack relative to the conveyor belt in the horizontal direction according to the first vertical distance, the third vertical distance, and the third distance, and controls the second driver to drive the loading rack to rotate to remove the angular deviation.

6. The unloading device of claim 5, wherein:
  the third distance is smaller than a width of the loading tray.

7. The unloading device of claim 3, wherein:
  each of the first distance sensor and the second distance sensor comprises a pulley, a wheel rod, an elastic restoring member, and a pressure sensitive member;
  the wheel rod is coupled between the pulley and the elastic restoring member;
  the pulley is used for providing a rolling contact with a side of the loading tray facing away from the conveyor belt;

the pressure sensitive member is used to sense a pressure at a contact position between the pulley and the loading tray; and the elastic restoring member is used to provide a restoring force for restoring the wheel rod and the pulley.

8. The unloading device of claim 4, wherein:
the loading rack comprises two opposite side walls;
each side wall comprises an inner surface and an outer surface;
each inner surface faces the other side wall, and each outer surface faces away from the other side wall;
each inner surface is provided with a plurality of parallel and equidistantly spaced sliding grooves, and each of the sliding grooves of one side wall corresponds to a respective sliding groove of the other side wall; and
each loading tray is received in the corresponding two opposite sliding grooves.

9. The unloading device of claim 8, wherein:
the first driver is used to drive the loading rack to move at predetermined height increments, so that the movable rod extends between every two opposite sliding grooves to push the corresponding loading tray.

10. An unloading device for unloading and conveying materials, the unloading device comprising:
a loading assembly comprising a loading rack and at least one loading tray movably received in the loading rack, the loading tray used for holding the materials;
an unloading assembly comprising a conveyor belt and a movable rod, the loading rack arranged between the conveyor belt and the movable rod, a distance between the conveyor belt and the loading rack smaller than a length of the loading tray, the movable rod used to extend into the loading rack and push the corresponding loading tray toward the conveyor belt, and the conveyor belt used to transport the loading tray; and
an alignment assembly comprising a sensing member, a processor, and a driving member, the sensing member used to sense a first distance between each of at least two positions of the loading tray and the sensing member, a second distance being defined between the sensing member and the loading rack; wherein:
when one end of the loading tray rests on the conveyor belt and an opposite end of the loading tray rests on the loading rack, the end of the loading tray resting on the conveyor belt is within a sensing range of the sensing member;
the sensing member is used for sensing the first distance between the sensing member and the different positions of the end of the loading tray on the conveyor belt; and
the processor is used to calculate a position deviation of the loading tray relative to the conveyor belt according to the at least two first distances and the second distance, the processor configured to control the driving member to drive the loading rack to move to compensate for the position deviation.

11. The unloading device of claim 10, wherein:
the driving member comprises a first driver and a second driver;
the first driver is used to drive the loading rack to move in a vertical direction;
the second driver is used to drive the loading rack to rotate in a direction parallel to an extension direction of the conveyor belt.

12. The unloading device of claim 11, wherein:
the sensing member comprises a first distance sensor and a second distance sensor;

the first distance sensor and the second distance sensor are arranged a same distance above the conveyor belt along the extension direction of the conveyor belt;
the first distance sensor is used to sense a first vertical distance between a first position of the loading plate and the first distance sensor, and the second distance sensor is used to sense a second vertical distance between a second position of the loading tray and the second distance sensor;
the first distance comprises the first vertical distance and the second vertical distance; and
the processor calculates a height deviation of the loading rack in the vertical direction relative to the conveyor belt according to the first vertical distance, the second vertical distance, and the second distance, and controls the first driver to drive the loading rack to move to remove the height deviation.

13. The unloading device of claim 12, wherein:
the second distance sensor is located between the first distance sensor and the loading rack; and
a sum of a distance between the first distance sensor and the second distance sensor and a distance between the first distance sensor and the loading rack is less than the length of the loading tray.

14. The unloading device of claim 13, wherein:
the sensing member further comprises a third distance sensor:
the third distance sensor and the first distance sensor are arranged a same distance above the conveyor belt along a horizontal direction;
a third distance is defined between the third distance sensor and the first distance sensor;
the third distance sensor is used to sense a third vertical distance between a third position of the loading tray and the third distance sensor;
the first distance further comprises the third vertical distance; and
the processor calculates an angular deviation of the loading rack relative to the conveyor belt in the horizontal direction according to the first vertical distance, the third vertical distance, and the third distance, and controls the second driver to drive the loading rack to rotate to remove the angular deviation.

15. The unloading device of claim 14, wherein:
the third distance is smaller than a width of the loading tray.

16. The unloading device of claim 15, wherein:
each of the first distance sensor and the second distance sensor comprises a pulley, a wheel rod, an elastic restoring member, and a pressure sensitive member;
the wheel rod is coupled between the pulley and the elastic restoring member;
the pulley is used for providing a rolling contact with a side of the loading tray facing away from the conveyor belt;
the pressure sensitive member is used to sense a pressure at a contact position between the pulley and the loading tray; and
the elastic restoring member is used to provide a restoring force for restoring the wheel rod and the pulley.

17. The unloading device of claim 16, wherein:
the loading rack comprises two opposite side walls;
each side wall comprises an inner surface and an outer surface;
each inner surface faces the other side wall, and each outer surface faces away from the other side wall;

each inner surface is provided with a plurality of parallel and equidistantly spaced sliding grooves, and each of the sliding grooves of one side wall corresponds to a respective sliding groove of the other side wall; and each loading tray is received in the corresponding two opposite sliding grooves.

18. The unloading device of claim 17, wherein:

the first driver is used to drive the loading rack to move at predetermined height increments, so that the movable rod extends between every two opposite sliding grooves to push the corresponding loading tray.

\* \* \* \* \*